(12) United States Patent
Mantei et al.

(10) Patent No.: US 9,039,318 B2
(45) Date of Patent: May 26, 2015

(54) COMPONENT CONNECTION COMPRISING A FIRST AND A SECOND COMPONENT AND A MALE AND A FEMALE FIXING ELEMENT

(71) Applicant: Bayerische Motoren Werke Aktiengesellschaft, Munich (DE)

(72) Inventors: Ingo Mantei, Munich (DE); Johann Van Niekerk, Munich (DE)

(73) Assignee: Bayerische Motoren Werke Aktiegesellschaft, Munich (DE)

( * ) Notice: Subject to any disclaimer, the term of this patent is extended or adjusted under 35 U.S.C. 154(b) by 140 days.

(21) Appl. No.: 13/790,882

(22) Filed: Mar. 8, 2013

(65) Prior Publication Data

US 2013/0185916 A1  Jul. 25, 2013

Related U.S. Application Data

(63) Continuation of application No. PCT/EP2011/003931, filed on Aug. 5, 2011.

(30) Foreign Application Priority Data

Sep. 10, 2010 (DE) .......... 10 2010 040 547

(51) Int. Cl.
*F16B 17/00* (2006.01)
*B23P 17/00* (2006.01)
(Continued)

(52) U.S. Cl.
CPC ........... *F16B 17/00* (2013.01); *Y10T 29/49826* (2015.01); *Y10T 403/7039* (2015.01);
(Continued)

(58) Field of Classification Search
CPC .. B23K 31/02; B23K 37/04; B23K 2201/006; B23K 2201/18; F16B 5/0621; F16B 17/00; F16B 5/0664; F16B 5/07; F16B 5/08; F16B 21/073; F16B 21/09; F16B 5/0642

USPC ......... 29/428, 441.1, 442, 525; 403/361, 373, 403/374.1, 266; 228/130, 101; 156/91

See application file for complete search history.

(56) References Cited

U.S. PATENT DOCUMENTS 3,152,376 A 10/1964 Boser et al.
4,181,350 A 1/1980 Eichstaedt
(Continued)

FOREIGN PATENT DOCUMENTS

BE  414895  4/1936
DE  26 15 567 A1  10/1977
(Continued)

OTHER PUBLICATIONS

International Search Report dated Oct. 11, 2011 including English translation (Six (6) pages).
(Continued)

*Primary Examiner* — John C Hong
(74) *Attorney, Agent, or Firm* — Crowell & Moring LLP

(57) ABSTRACT

A component connection includes a first vehicle component which has a male fixing element projecting from the first vehicle component, and a second vehicle component, which has a female fixing element that is intended for receiving the male fixing element. The male fixing element is inserted into the female fixing element in an insertion direction. The male fixing element has a functional head, which has partially or completely the shape of a sphere or partially or completely a shape similar to a sphere, and the male fixing element has a foot region, which is connected to the second component in a positive locking manner. The functional head has an excessive dimension in relation to the female fixing element in essence transversely to the insertion direction, so that the two vehicle components can be clamped together in a detachable manner at the fixing elements.

24 Claims, 3 Drawing Sheets

(51) Int. Cl.
  *B23K 31/02* (2006.01)
  *B23K 37/04* (2006.01)
  *F16B 5/06* (2006.01)
  *F16B 5/07* (2006.01)
  *F16B 5/08* (2006.01)
  *F16B 21/07* (2006.01)
  *F16B 21/09* (2006.01)

(52) U.S. Cl.
  CPC .............. *B23K31/02* (2013.01); *B23K 37/04* (2013.01); *B23K 2201/006* (2013.01); *B23K 2201/18* (2013.01); *F16B 5/0621* (2013.01); *F16B 5/0642* (2013.01); *F16B 5/0664* (2013.01); *F16B 5/07* (2013.01); *F16B 5/08* (2013.01); *F16B 21/073* (2013.01); *F16B 21/09* (2013.01)

(56) References Cited

U.S. PATENT DOCUMENTS

| | | | |
|---|---|---|---|
| 4,637,116 A | 1/1987 | Paerisch et al. | |
| 5,441,095 A | 8/1995 | Trethewey | |
| 5,642,641 A | 7/1997 | Maxfield, Jr. et al. | |
| 2009/0070983 A1 | 3/2009 | Stumpf et al. | |
| 2011/0173797 A1 | 7/2011 | van Niekerk et al. | |
| 2012/0043228 A1* | 2/2012 | Ezzo et al. | 206/1.5 |
| 2013/0036591 A1* | 2/2013 | Holderman et al. | 29/428 |
| 2013/0071181 A1* | 3/2013 | Herzinger et al. | 403/361 |

FOREIGN PATENT DOCUMENTS

| | | |
|---|---|---|
| DE | 197 39 350 a1 | 3/1999 |
| DE | 10 2007 044 635 A1 | 4/2009 |
| DE | 10 2008 038 747 A1 | 2/2010 |
| DE | 10 2009 049 602 B3 | 7/2011 |
| DE | 10 2010 028 322 A1 | 11/2011 |
| DE | 10 2010 028 323 A1 | 11/2011 |
| EP | 0 434 447 A1 | 6/1991 |
| FR | 2 761 626 A1 | 10/1998 |

OTHER PUBLICATIONS

German-language Office Action dated Nov. 15, 2012 (Six (6) pages).
German-language Office Action dated Jul. 25, 2011 (Six (6) pages).

* cited by examiner

COMPONENT CONNECTION COMPRISING A FIRST AND A SECOND COMPONENT AND A MALE AND A FEMALE FIXING ELEMENT

CROSS REFERENCE TO RELATED APPLICATIONS

This application is a continuation of PCT International Application No. PCT/EP2011/003931, filed Aug. 5, 2011, which claims priority under 35 U.S.C. §119 from German Patent Application No. 10 2010 040 547.7, filed Sep. 10, 2010, the entire disclosures of which are herein expressly incorporated by reference.

BACKGROUND AND SUMMARY OF THE INVENTION

The present invention relates to a component connection including a first component, in particular, a first vehicle component having a male fixing element projecting from the first component, and a second component, in particular, a second vehicle component having a female fixing element intended for receiving the male fixing element, as well as to a method for preassembling in a detachable manner, the first and second components.

A component connection of this type is known from earlier German patent application DE 10 2010 028 323 A1, which is not a prior publication. Furthermore, the relevant prior art includes DE 10 2009 049 602.5, DE 10 2008 038 747 A1, DE 10 2009 041 161 A1, DE 10 2010 028 322 A1, and DE 10 2007 044 635 A1.

During mass production of vehicle bodies a plurality of individual body parts and add-on parts, such as holders, etc., are assembled in such a way that the process is totally automated to a large extent. During a joining operation, two or more vehicle body parts are first positioned relative to one another by means of a time consuming chucking and receiving technique, and are then subsequently connected together, for example, by welding, clinching or other joining methods.

In the aforementioned DE 10 2009 049 602.5, the objective is to achieve a loose prefixing of two components that are to be firmly connected to each other. A spherical shaped-locking element is provided on a first component, from which the spherical shaped-locking element projects and engages in a recess of the second component. This recess is configured, for example, in the manner of a key hole. The two components that are to be connected to each other are mutually fitted together and then subsequently moved relative to each other, so that their displacement produces a positive locking engagement. Owing to this positive locking engagement the two components are prefixed relative to each other and then can be securely connected to each other, for example, by welding.

The object of the present invention is to provide a method and component connection for connecting components, by which components, in particular, body parts of vehicles as well as add-on parts, can be (pre)assembled in a simple and easy way.

This and other objects are achieved by a component connection including a first component, in particular, a first vehicle component having a male fixing element projecting from the first component, and a second component, in particular, a second vehicle component having a female fixing element intended for receiving the male fixing element. The male fixing element is inserted into the female fixing element in an insertion direction, wherein the male fixing element includes a functional head that has partially or completely the shape of a sphere or partially or completely a shape similar to a sphere; and the functional head has an excessive dimension in relation to the female fixing element in essence transversely to the insertion direction, so that the two components are clamped together at the fixing elements. The male fixing element also includes a foot region, which is connected to the first component in a positive locking manner.

The starting point of the invention is a component connection that connects a first component, which may be a first component of a vehicle, to a second component, which may be a second component of a vehicle. The term "vehicle component" is to be interpreted very broadly. In principle, it includes any kind of component that may be considered for the purpose of connecting components, in particular, a body component of a vehicle. When a "vehicle component" is addressed below, it is not to be interpreted in a restrictive manner. Rather, the invention is to be broadly construed as being for connecting components generally (and also in other industrial sectors). Correspondingly, the patent claim language is also to be interpreted in a broad sense.

The first of the two (vehicle) components comprises a "male fixing element" that projects from the first (vehicle) component; and this male fixing element comprises a functional head and a foot region that is connected to the functional head. The functional head and the foot region can be connected in one piece to each other.

The functional head has, partially or completely, the shape of a sphere or, more specifically, a cap or partially or completely a shape similar to a sphere. The concept "similar to a sphere" may also be interpreted very broadly and must not be limited to any mathematical concept of a spherical geometry. The concept "similar to a sphere" may also be understood to mean, for example, that the shape is "curved in a convex manner." The above-described shapes of the functional head will also broadly be referred to as a "spherical shape." Preferably, the male fixing element that is constructed in the shape of a sphere, i.e. is a "spherical shape," or similar to a sphere is rotationally symmetrical with respect to the direction of a normal line of one or both vehicle components at the location of the male fixing element. The terms "spherical" or "similar to a sphere" include, as a general principle, "round" or "curved," in particular, "convexly curved" geometries.

The foot region has, generally speaking, the function of a connecting element, by which the functional head is connected or will be connected to the first component. The foot region can be constructed in such a manner that it can be connected to the first component by way of a cold joining procedure. The foot region can be constructed as a "press fit element" in an economical way. With current press fit techniques (such as pop rivets), the foot region can be "press fit" into the first component with a high degree of accuracy, so that the press fitting operation produces a positive locking connection with the first component that cannot be detached, i.e. a connection that is permanently secured. The foot region can be configured, for example, as a self-piercing rivet. The press fitting of the foot section can be carried out in a fully automated manner by use of a suitable robot device. As an alternative, a press fitting device can be integrated into the forming tool. For example, a pop rivet device can be integrated into a deep drawing tool, an arrangement that makes it possible to set the male fixing element during or towards the end of a deep drawing operation, by which the first (sheet metal) component is formed into a three dimensional object.

As an alternative, the foot region could also be configured as a screw shank and could be intended to be screwed into an associated tapped bore of the first component.

A male fixing element that is configured in this way can be fitted together with the second (vehicle) component in a very easy way by use of the functional head. The round, edgeless geometry of the male fixing element minimizes the risk of an unintentional tilting of the two (vehicle) components when they are fitted together.

The second (vehicle) component has a "female fixing element" that is intended for receiving the male fixing element. The term "female fixing element" is also to be interpreted very broadly. What is meant are the design configurations that enable the male fixing element to be inserted into the female fixing element in an insertion direction. To put it more precisely, the female fixing element does not receive the entire male fixing element, but rather that part of the male fixing element that projects from the first component. That is, the female fixing element receives in essence the functional head of the male fixing element.

The functional head of the male fixing element has an excessive dimension in relation to the female fixing element. The excessive dimension can exist, in particular, in a direction that is transverse to the insertion direction. When the two (vehicle) components are fitted together, the excessive dimension makes it possible to clamp the two (vehicle) components together at the fixing elements in such a way that the two components can be detached.

Hence, the (vehicle) components can be easily fitted together in a manner known from plug-in construction kits from the toy domain and can be (pre)fixed relative to each other in this way.

(Vehicle) components, such as individual body parts of vehicles, can be connected to each other, i.e. (pre)assembled, by means of one or more such component connections. In this case the individual components need only be "fitted together." Depending on the type of (vehicle) component and the "clamping force" that is intended in terms of the design, the two (vehicle) components can be connected to each other exclusively by the component connection according to the invention or, in addition, by one or more other joining techniques, such as welding, screwing, riveting, clinching, etc. In particular, such joining techniques that can be produced on the part of a single component ("one-sided connection methods") are also suitable. One example that may be mentioned here is laser welding, where, in contrast to spot welding methods, the "component composite" does not have to be accessible from both sides by means of welding tongs, but rather work can be performed from a single side.

A positive locking engagement in the insertion direction between the fixing elements can be provided. However, it is not absolutely mandatory that such a positive locking engagement be provided. In other words, it is not absolutely necessary that an undercut of the male and female fixing element be provided.

The female fixing element can be formed by a "passage hole" provided in the second (vehicle) component. The term "passage hole" is to be broadly interpreted and must not be limited per se to a certain hole geometry. The passage hole can be, for example, circular or have a geometry that deviates from a circular shape, such as a geometry that is in essence square or a geometry that has the shape of a triangle, rectangle or polygon, where the "corners" may be rounded.

Since the functional head of the male fixing element has a defined excessive dimension transversely to the insertion direction in relation to the female fixing element, the two fixing elements (or at least one of the two fixing elements) have to exhibit a certain degree of "minimum elasticity," in order to facilitate the fitting together and so that an adequate amount of clamping force remains after the fitting together.

The functional head of the male fixing element can be, for example, a sphere made of a solid material, in particular a steel or aluminum sphere. Such a "solid sphere" exhibits comparatively little elasticity. The minimum elasticity that is necessary for fitting together can be achieved by way of a suitable design of the female fixing element.

It can be provided that upon being fit together, the two (vehicle) components are connected to each other with zero play on the fixing elements in directions that are transverse to the insertion direction. That is, the vehicle components are fixed in such a way that they cannot be displaced relative to each other.

As stated above, the two (vehicle) components can be (pre)fixed relative to each other by use of a plurality of such component connections or similar component connections. Correspondingly, one of the two (vehicle) components can have at least one additional male fixing element of this type (see the above description) that also has partially or completely the shape of a sphere or more specifically partially or completely a shape similar to a sphere; and this one additional male fixing element can be inserted or is inserted into an associated additional female fixing element, which is provided on the respective other (vehicle) component, in one or in the same direction of insertion as the first male fixing element.

The at least one additional female fixing element can be formed by a slot or, more specifically, an oblong passage hole, in which a functional head of the additional male fixing element is slid in a longitudinal direction of the slot or, more specifically, the oblong passage hole.

Therefore, the one "component connection" forms, figuratively speaking, a "fixed bearing;" and the at least one additional component connection forms a "floating bearing." This arrangement has the advantage that the two (vehicle) components that are to be connected to each other can be fitted together, or rather can be fixed on each, other in "a floating" manner and, as a result, in essence without tension.

According to a further aspect of the invention, at least one flexible clamping element, which projects from the second (vehicle) component, is provided on an edge of the passage hole that forms the female fixing element. The clamping element exerts from the outside a clamping force, which acts more or less transversely to the direction of insertion, on the outside of the functional head of the male fixing element. The clamping element can extend behind the functional head of the male fixing element. However, this does not have to be necessarily the case. In the case of an undercut, the joining together, i.e. the fitting together of the two fixing elements, results in one of the fixing elements being "pushed over" the other fixing element, so that it is possible to hear the functional head of the male fixing element snap locking into or, more specifically, onto the female fixing element.

The clamping element can be a clamping collar that extends along the entire edge of the passage hole. As an alternative, only one clamping collar element need be provided; and this clamping collar element extends over a peripheral section. Furthermore, a plurality of clamping collars that are spaced apart from each other in the circumferential direction may be provided along the passage hole. In this context the clamping collars touch from the outside on a peripheral section or on a peripheral point of the functional head of the male fixing element. It can also be provided that only one portion of the provided clamping collars presses from the outside against the functional head of the male fixing element.

It can be provided that the clamping collar or rather the clamping collars projects or project from the second (vehicle)

component in the direction of insertion or against the direction of insertion. The at least one clamping collar does not have to be bent in its entirety perpendicular with respect to the second vehicle part, but rather can be positioned in a slightly inclined manner. For example, it can be provided that the at least one clamping collar encloses with the surface of the second (vehicle) component in an area of the passage hole an angle in a range that lies between 80° and 90°.

The first and/or the second (vehicle) component may be a sheet metal component, in particular, a body part of a vehicle. As an alternative, the first and/or the second (vehicle) component may also be a plastic component, in particular, a plastic component made of a synthetic plastic material that is reinforced with fibers.

The passage hole that forms the female fixing element can be punched out of the second (vehicle) component. The clamping collar may be a "bent," "raised," or upright section of the punched passage hole.

One or both of the vehicle parts can be, in particular, a deep drawn part or deep drawn parts. The at least one female fixing element, which can be formed, for example, by a passage hole, can be punched out directly in the deep drawing tool or can be produced in a subsequent production step.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
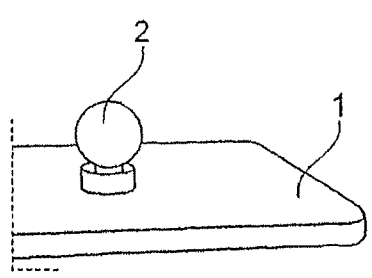
FIG. 1 is a perspective view of a sheet metal plate, onto which a steel sphere is welded.

FIG. 1 shows a first sheet metal plate 1, on which a male fixing element is fixed. The male fixing element has a functional head that is designed as a steel sphere 2.

Figure 2:
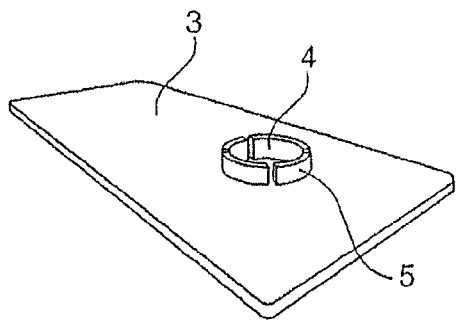
FIGS. 2 and 3 are different perspective views of a sheet metal plate with a passage hole having a circumferential clamping collar.
Figure 3:
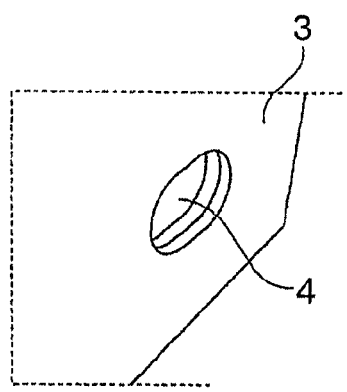

FIGS. 2 and 3 show a second sheet metal plate 3, into which a passage hole 4 is punched. This passage hole has a bent collar 5 that acts as a clamping collar. The passage hole 4 and the clamping collar 5, respectively, have a slightly smaller diameter than the sphere 2 that forms the functional head. However, the clamping collar is sufficiently elastic, so that the sphere 2 can be pressed into or, more specifically pressed through, the passage hole 4.

The passage hole 4 can have, as shown in FIGS. 2 and 3, an approximately rectangular or square shape with "rounded" corners. In the case that the passage hole geometry is approximately square, the clamping collar 5 presses from the outside against the sphere 2 in a point-like manner at four locations, which are spaced approximately 90° apart from each other.

Figure 4:
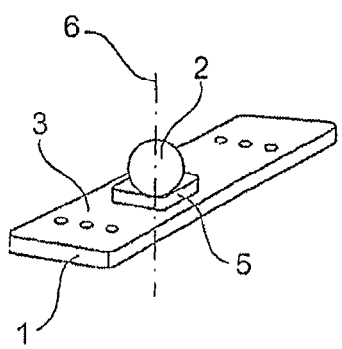
FIGS. 4 to 6 are perspective views showing a number of exemplary embodiments with different clamping collars.

FIG. 4 shows the two sheet metal plates 1, 3 in the fitted together state. The sphere 2, which is fixed on the sheet metal plate 1, was pushed through the passage hole 4 from the bottom. The clamping collar 5 presses more or less transversely relative to the direction of insertion 6 from the outside against the sphere 2. As a result, the two sheet metal plates 1, 3 are positioned securely and, in essence, with zero play relative to each other in directions that are transverse to the direction of insertion 6.

Figure 5:
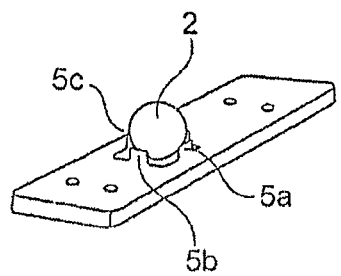

FIG. 5 shows an exemplary embodiment, where, instead of a circumferential clamping collar, a plurality of clamping collar elements 5a, 5b, 5c, which resemble teeth, are provided in a uniformly distributed manner about the circumference of the passage hole.

Figure 6:
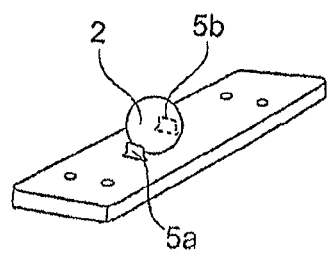

In the exemplary embodiment of FIG. 6, only two such tooth-like clamping collar elements 5a, 5b are provided; and these tooth-like clamping collar elements are spaced approximately 180° apart from each other in the circumferential direction. The two clamping collar elements 5a, 5b are arranged on opposite sides of the sphere 2.

Figure 7:
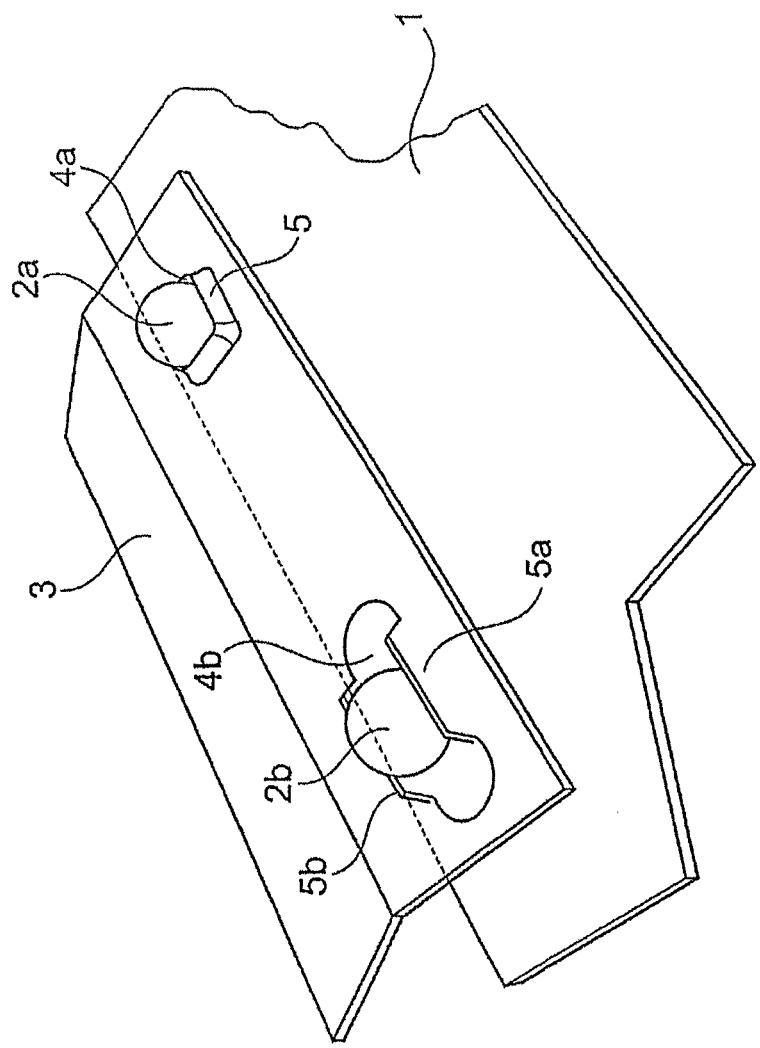
FIG. 7 is a perspective view showing two components according to the invention; and these two components are fixed to each other in a floating manner.

FIG. 7 shows an exemplary embodiment, in which a first sphere 2a and a second sphere 2b are arranged on a first sheet metal plate 1 such that they are spaced apart from each other. Each of the two spheres 2a, 2b is connected to the sheet metal plate 1 by a foot region, which is a part of the respective male fixing element, but is not shown more closely in the embodiment. The foot regions or, more specifically the foot sections, may have been connected to the sheet metal plate 1, for example, by way of cold joining techniques. Of the wide range of "press fit methods" that may be considered here, one example is the pop rivet method.

The second sheet metal plate 3 has a first rectangular or square passage hole 4a, which is assigned to the sphere 2a. This passage hole 4a has a circumferential clamping collar 5 that is similar to the clamping collar depicted in the FIGS. 2 to 4. As a result, the two sheet metal plates 1, 3 are securely fixed relative to each other transversely to the direction of insertion in the region of the sphere 2a.

In contrast, the second passage hole 4b involves an oblong passage hole having two clamping collars 5a, 5b, which extend in the longitudinal direction of the hole; and each of these clamping collars pushes against the outside of the sphere 2b from the opposite side. In the arrangement depicted in FIG. 7, the sheet metal plates 1,3 are fixed on each other "in a floating manner." The oblong hole 4b eliminates any tension between the fastening points.

The two sheet metal plates 1, 3 can be easily fitted together and then subsequently connected to each other securely and permanently, for example, by welding. The thermal expansion occurring during the welding operation is "automatically" equalized owing to the floating arrangement of the two sheet metal plates.

Figure 8:
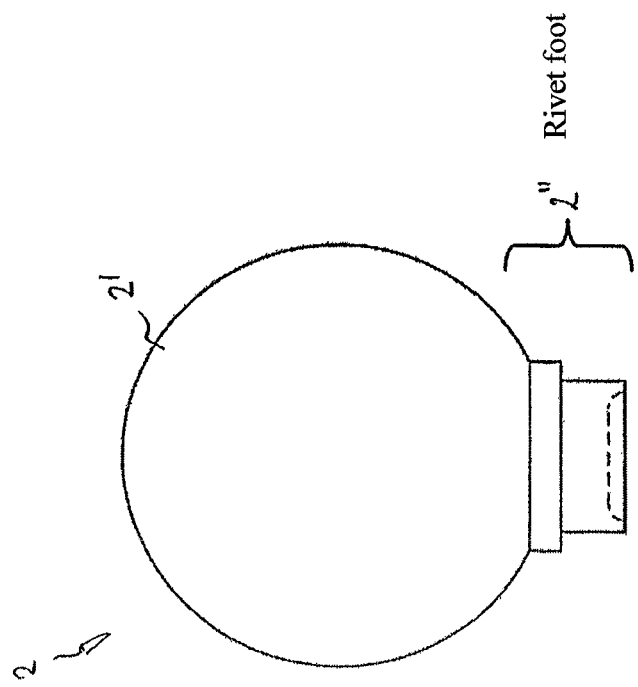
FIG. 8 is a side view of a first exemplary embodiment of a male fixing element according to the invention.

FIG. 8 shows a male fixing element 2, which includes a spherical functional head 2' and a foot region or, more specifically a foot section 2", that is integrally connected to the functional head. In this case the foot region 2" is constructed in the form of a (self-piercing) pop rivet. In the course of setting, i.e. in the course of pressing the foot region 2", designed as a pop rivet, the frontal region of the foot region 2" penetrates into the first sheet metal plate 1 (cf. FIG. 1) and, in so doing, expands radially, so that the result is a permanently secured, positive locking connection with the first sheet metal plate 1.

Figure 9:
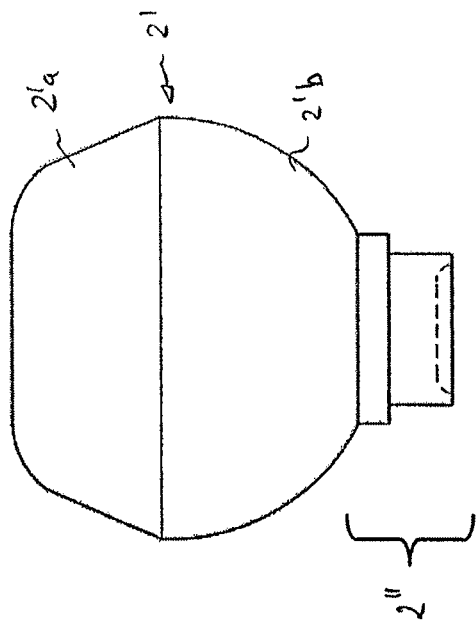
FIG. 9 is a side view of a second exemplary embodiment of a male fixing element according to the invention.

FIG. 9 shows an exemplary embodiment, in which the functional head 2' exhibits an upper rounded region 2'a, which tapers off conically towards the top, and a spherical region 2'b, which is connected to the upper rounded region towards the bottom. The spherical region 2'b is designed as a pop rivet via its foot region 2" in a manner analogous to the exemplary embodiment in FIG. 8.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component connection, comprising:
   a first component, which has a male fixing element projecting from the first component;
   a second component, which has a female fixing element configured to receive the male fixing element, wherein the male fixing element is insertable into the female fixing element in an insertion direction; and
   wherein the male fixing element comprises:
      a functional head having at least partially a spherical shape, the functional head having an excessive dimension in relation to the female fixing element essentially transverse to the insertion direction so as to interfere when inserted, wherein the first and second components are clamped together at the male and female fixing elements, and
      a foot region extending from and integrally connected to the functional head, the foot region being connected to the first component in a positive locking manner.

2. The component connection according to claim 1, wherein the first component is a first vehicle component and the second component is a second vehicle component.

3. The component connection according to claim 1, wherein the female fixing element comprises a passage hole formed in the second component.

4. The component connection according to claim 3, wherein the passage hole has a non-circular shape.

5. The component connection according to claim 3, wherein the passage hole is configured to have one of a substantially square or substantially triangular shape.

6. The component connection according to claim 3, further comprising at least one flexible clamping element projecting from the second component and being arranged on an edge of the passage hole; and
   wherein the at least one flexible clamping element is operatively configured to exert a clamping force acting essentially transverse to the insertion direction on an outer surface of the male fixing element.

7. The component connection according to claim 6, wherein the at least one clamping element extends behind the male fixing element.

8. The component connection according to claim 6, wherein the at least one clamping element comprises a clamping collar extending along an entire edge of the passage hole.

9. The component connection according to claim 6, wherein a plurality of clamping collars are spaced apart from one another in a circumferential direction along an edge of the passage hole, the plurality of clamping collars forming the clamping element that exerts the clamping force on an outer peripheral section of the male fixing element.

10. The component connection according to claim 6, wherein the at least one flexible clamping element projects from the second component either in the insertion direction or against the insertion direction.

11. The component connection according to claim 6, wherein the at least one flexible clamping element comprises a bent section of the second component.

12. The component connection according to claim 3, wherein the passage hole is a punched passage hole in the second component.

13. The component connection according to claim 1, wherein the first and second components are fixed immovably relative to one another in directions transverse to the insertion direction in a region of the male and female fixing elements.

14. The component connection according to claim 1, further comprising an additional male fixing element and an additional female fixing element; and
   wherein the additional male fixing element has an at least partial spherical shape and is insertable into the additional female fixing element in one or a same insertion direction.

15. The component connection according to claim 14, wherein the additional female fixing element comprises an oblong passage hole in which the additional male fixing element is slidable in a longitudinal direction of the oblong passage hole.

16. The component connection according to claim 1, wherein at least one of the first component and the second component is a sheet metal component.

17. The component connection according to claim 1, wherein at least one of first component and the second component is a vehicle body component.

18. The component connection according to claim 1, wherein the male fixing element is made completely of metal.

19. The component connection according to claim 1, further comprising an additional connection by which the first and second components are securely connected directly to one another.

20. The component connection according to claim 1, wherein the foot region is configured as a self-piercing rivet, and forms a self-piercing riveting connection with the first component.

21. A method for preassembling in a detachable manner at least two vehicle components, the method comprising the acts of:
   providing a male fixing element on one of the two components, the male fixing element having a functional head at least partially in a spherical shape and a foot region extending from and integrally connected to the functional head, the foot region being connected to the first component in a positive locking manner via a cold joining process;
   providing a female fixing element on another of the two vehicle components, the female fixing element comprising a passage hole provided in the other component; and
   inserting the male fixing element of the one component into the female fixing element of the other component in an insertion direction, the functional head of the male fixing element having an excessive dimension in relation to the female fixing element essentially transverse to the insertion direction so as to interfere during the inserting, wherein the male fixing element is securely clamped on the female fixing element to preassemble the two components in the detachable manner.

22. The component connection according to claim 1, wherein the foot region is configured as a rivet, and forms a riveted connection with the first component.

23. The method according to claim 21, wherein the foot region is configured as a rivet, the method further comprising:
   riveting the foot region to the first component.

24. The method according to claim 21, wherein the foot region is configured as a self-piercing rivet, the method further comprising:
   self-pierce riveting the foot region to the first component.

* * * * *